United States Patent
Wu

(10) Patent No.: US 10,118,865 B2
(45) Date of Patent: Nov. 6, 2018

(54) GLAZE RESISTANT TO WAX BLOCK BONDING, CERAMIC RESISTANT TO WAX BLOCK BONDING AND PREPARATION PROCESS THEREOF

(71) Applicant: BeautyAvenues, LLC, Reynoldsburg, OH (US)

(72) Inventor: Yangcheng Wu, Jieyang (CN)

(73) Assignee: BeautyAvenues, LLC, Reynoldsburg, OH (US)

( * ) Notice: Subject to any disclaimer, the term of this patent is extended or adjusted under 35 U.S.C. 154(b) by 0 days.

(21) Appl. No.: 15/802,940

(22) Filed: Nov. 3, 2017

(65) Prior Publication Data

US 2018/0127322 A1    May 10, 2018

(30) Foreign Application Priority Data

Nov. 7, 2016  (CN) .......................... 2016 1 0975455

(51) Int. Cl.
  *C04B 41/86*   (2006.01)
  *C03C 8/00*    (2006.01)
  (Continued)

(52) U.S. Cl.
  CPC .............. *C04B 41/86* (2013.01); *C01B 33/12* (2013.01); *C01F 5/02* (2013.01); *C01F 7/02* (2013.01);
  (Continued)

(58) Field of Classification Search
  CPC .............. C04B 41/86; C03C 8/00; C03C 8/02
  See application file for complete search history.

(56) References Cited

U.S. PATENT DOCUMENTS 4,805,551 A * 2/1989 Marazzi ................ B28B 11/044
                                                           118/64
5,292,245 A   3/1994 Spoonhour et al.
(Continued)

FOREIGN PATENT DOCUMENTS

CN       103896634 A  *  7/2014
CN       105776861 A     7/2016

OTHER PUBLICATIONS

European Search Report issued in corresponding EP Application No. 17199685.3, dated Mar. 19, 2018.

*Primary Examiner* — Karl E Group
(74) *Attorney, Agent, or Firm* — Andrus Intellectual Property Law, LLP

(57) ABSTRACT

A glaze resistant to wax block bonding, a ceramic resistant to wax block bonding and a preparation process thereof are disclosed. The components of the disclosed glaze are made up of potassium feldspar, lithium feldspar, calcium carbonate, talc, kaolin, wollastonite, quartz, alumina and nanopowder, the components being in the following parts by weight: potassium feldspar 30, lithium feldspar 8, calcium carbonate 10, talc 6, kaolin 10, wollastonite 10, quartz 26, alumina 1 and nanopowder 20. Sources of the starting materials required are abundant, the price is low, the production cost is low, and a glaze surface layer resistant to wax block bonding is formed on the surface of the ceramic resistant to wax block bonding produced, thereby effectively solving the problem of the difficulty of removal of molten wax from the burning of candles which has dripped down and hardened on the surface of ceramic.

13 Claims, 1 Drawing Sheet

(51) Int. Cl.
    *C01B 33/12*     (2006.01)
    *C01F 5/02*     (2006.01)
    *C01F 7/02*     (2006.01)
    *C01F 11/02*     (2006.01)
    *C01G 9/02*     (2006.01)
    *C03C 8/04*     (2006.01)
    *C04B 41/00*     (2006.01)
    *C04B 41/50*     (2006.01)

(52) U.S. Cl.
    CPC ............... *C01F 11/02* (2013.01); *C01G 9/02* (2013.01); *C03C 8/04* (2013.01); *C04B 41/009* (2013.01); *C04B 41/5022* (2013.01); *C01P 2004/64* (2013.01)

(56) References Cited

U.S. PATENT DOCUMENTS

| | | | |
|---|---|---|---|
| 6,174,608 B1 * | 1/2001 | Bertocchi | ................. C03C 8/02 428/426 |
| 7,879,449 B2 | 2/2011 | Jeon et al. | |
| 2008/0199708 A1 * | 8/2008 | Akie | ....................... C03C 1/002 428/454 |

* cited by examiner

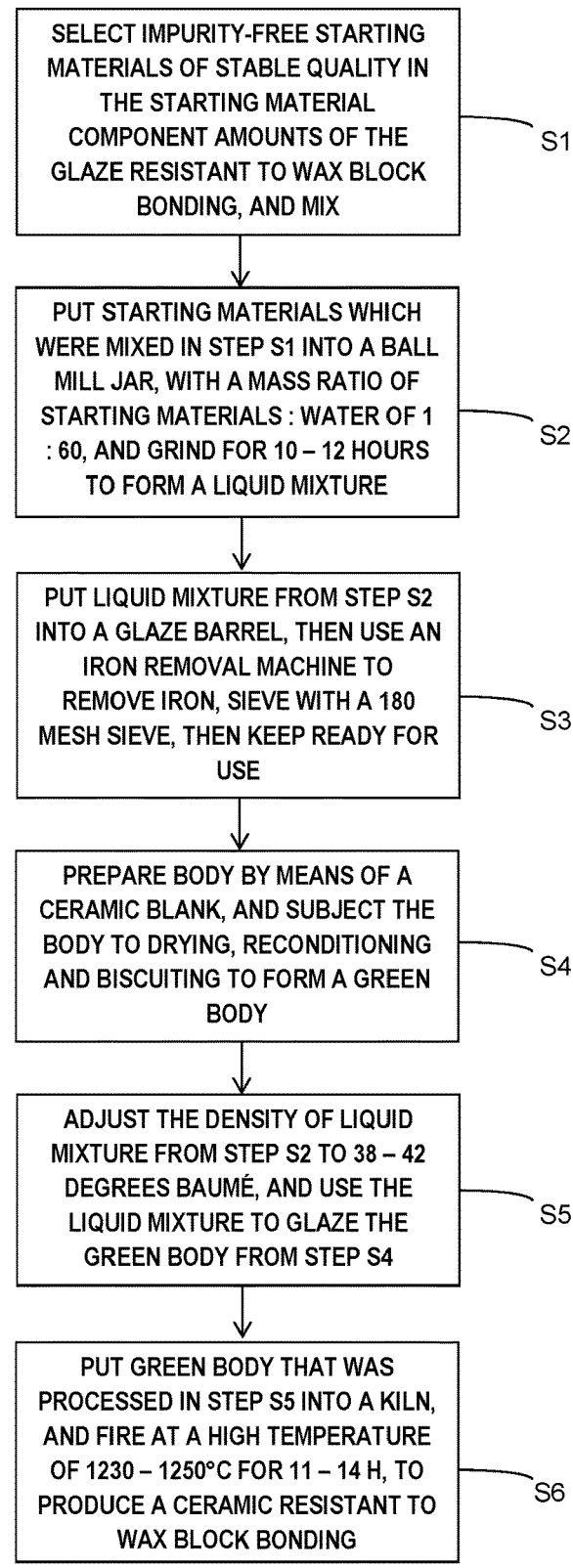

GLAZE RESISTANT TO WAX BLOCK BONDING, CERAMIC RESISTANT TO WAX BLOCK BONDING AND PREPARATION PROCESS THEREOF

CROSS-REFERENCE TO RELATED APPLICATION

The present application claims priority to Chinese Application Serial No. 201610975455.4, filed on Nov. 7, 2016, published as CN 106495742 A on Mar. 15, 2017, which application is hereby incorporated by reference herein.

FIELD

The present disclosure relates to the technical field of ceramic processing technology, in particular the technical field of glazes resistant to wax block bonding, ceramics resistant to wax block bonding and preparation processes thereof.

BACKGROUND

Ceramic is a consumer item that is indispensable in people's lives, and is also an important traditional industry in China. Ceramic products mainly include: building ceramics, ceramics for everyday use, sanitary ceramics, technical ceramics and special types of ceramics, etc. As social and economic development continues, market demand is rapidly increasing, with an ever broader range of types. The advantages of ceramics with regard to economy, practicality and aesthetics, etc. are much loved by consumers.

As the economy develops and people's living standards improve, people's demand for ceramics is steadily increasing, and tastes are becoming ever more lofty. The demand for usability is also constantly seeking the quality of being closer to everyday life, and making life easier. In the case of ceramic electrically heated molten incense burners and candle incense burners currently on the market, molten wax becomes firmly attached to the ceramic upon hardening, making withdrawal and replacement inconvenient. This problem has for a long time perplexed consumers.

SUMMARY

The content of the present disclosure consists of providing a glaze resistant to wax block bonding, a ceramic resistant to wax block bonding, and a preparation process thereof, to resolve the existing technical deficiency.

A first technical solution of the present disclosure is as follows: a glaze resistant to wax block bonding, the components of which are made up of potassium feldspar, lithium feldspar, calcium carbonate, talc, kaolin, wollastonite, quartz, alumina and nanopowder, the components being in the following parts by weight: potassium feldspar 30, lithium feldspar 8, calcium carbonate 10, talc 6, kaolin 10, wollastonite 10, quartz 26, alumina 1 and nanopowder 20.

Preferably, the nanopowder is made up of the following components: $Al_2O_3$, $CaCO_3$, $ZnO$, $BaCO_3$, $TiO_2$, $SiO_2$ and $MgO_2$.

More preferably, the components of the nanopowder are in the following parts by weight:

| | |
|---|---|
| $Al_2O_3$ | 3 parts |
| $CaCO_3$ | 1.3 parts |
| $ZnO$ | 1.2 parts |
| $BaCO_3$ | 0.4 part |
| $TiO_2$ | 1.1 parts |
| $SiO_2$ | 0.1 part |
| $MgO_2$ | 0.8 part |

A second technical solution of the present disclosure is as follows: a ceramic resistant to wax block bonding which contains the glaze resistant to wax block bonding.

A third technical solution of the present disclosure is as follows: a process for preparing a ceramic resistant to wax block bonding, comprising the following steps:

S1, selecting impurity-free starting materials of stable quality in the starting material component amounts of the glaze resistant to wax block bonding, and mixing;

S2, putting the starting materials which were mixed in step S1 into a ball mill jar, with a mass ratio of starting materials:water of 1:60, and grinding for 10-12 hours to form a liquid mixture;

S3, putting the liquid mixture from step S2 into a glaze barrel, then using an iron removal machine to remove iron, sieving with a 180 mesh sieve, then keeping ready for use;

S4, preparing a body by means of a ceramic blank, and subjecting the body to drying, reconditioning and biscuiting to form a green body;

S5, adjusting the density of the liquid mixture from step S2 to 38-42 degrees Baumé, and using the liquid mixture to glaze the green body from step S4;

S6, putting the green body that was processed in step S5 into a kiln, and firing at a high temperature of 1230-1250° C. for 11-14 h, to produce a ceramic resistant to wax block bonding.

BRIEF DESCRIPTION OF THE DRAWINGS

The single FIGURE illustrates one example of a method according to the present disclosure.

DETAILED DESCRIPTION

Beneficial Effects of the Present Disclosure:

The method is simple, sources of the required starting materials are abundant, the price is low, the production cost is low, and a glaze surface layer resistant to wax block bonding is formed on the surface of the ceramic resistant to wax block bonding that is produced, thereby effectively solving the problem of the difficulty of removal of molten wax from the burning of candles which has dripped down and hardened on the surface of ceramic.

PARTICULAR EXAMPLES

Example 1

A glaze resistant to wax block bonding, the components of which are made up of potassium feldspar, lithium feldspar, calcium carbonate, talc, kaolin, wollastonite, quartz, alumina and nanopowder, the components being in the following parts by weight: potassium feldspar 30, lithium feldspar 8, calcium carbonate 10, talc 6, kaolin 10, wollastonite 10, quartz 26, alumina 1 and nanopowder 20. The components of the nanopowder are as follows, in parts by weight:

| | |
|---|---|
| $Al_2O_3$ | 3 parts |
| $CaCO_3$ | 1.3 parts |
| ZnO | 1.2 parts |
| $BaCO_3$ | 0.4 part |
| $TiO_2$ | 1.1 parts |
| $SiO_2$ | 0.1 part |
| $MgO_2$ | 0.8 part |

A ceramic resistant to wax block bonding which contains the glaze resistant to wax block bonding.

A process for preparing a ceramic resistant to wax block bonding, comprising the following steps, as shown in the accompanying FIGURE:

S1, selecting impurity-free starting materials of stable quality in the starting material component amounts of the glaze resistant to wax block bonding, and mixing;

S2, putting the starting materials which were mixed in step S1 into a ball mill jar, with a mass ratio of starting materials:water of 1:60, and grinding for 10-12 hours to form a liquid mixture;

S3, putting the liquid mixture from step S2 into a glaze barrel, then using an iron removal machine to remove iron, sieving with a 180 mesh sieve, then keeping ready for use;

S4, preparing a body by means of a ceramic blank, and subjecting the body to drying, reconditioning and biscuiting to form a green body;

S5, adjusting the density of the liquid mixture from step S2 to 38-42 degrees Baumé, and using the liquid mixture to glaze the green body from step S4;

S6, putting the green body that was processed in step S5 into a kiln, and firing at a high temperature of 1230-1250° C. for 11-14 h, to produce a ceramic resistant to wax block bonding.

Example 2

Test of Resistance to Wax Block Bonding 100 pieces, in the form of sheets of the same size, of the ceramic resistant to wax block bonding formed in example 1 are selected as group A. 100 pieces, in the form of sheets of the same size, of ordinary ceramic on the market are selected as group B. The ceramics of groups A and B are laid flat at room temperature, then a burning candle is used to drip and harden on the surfaces of the ceramics of groups A and B. Once the molten wax has hardened, it is left for 30 minutes, then the ceramics of groups A and B are positioned vertically for 4 hours, and records are taken.

Results of records: More than half of the wax pieces in group A fall off naturally, and all of the remainder can completely fall off with ease if a simple external force is used, such as light wiping with the hand. The phenomenon of wax pieces falling off naturally did not occur in group B, and the remainder could not be easily removed by using a simple external force such as light wiping with the hand; complete removal was only possible by wiping with the aid of hot water.

The results above show that a glaze surface layer resistant to wax block bonding is formed on the surface of the ceramic resistant to wax block bonding that is produced in the present disclosure, thereby effectively solving the problem of the difficulty of removal of molten wax from the burning of candles which has dripped down and hardened on the surface of ceramic.

Specific examples of the present disclosure have been explained above, but the protected content of the present disclosure is not merely limited to the examples above. In the technical field of the present disclosure, a variety of alterations could be made within the scope of the main technical idea thereof, as long as one has a grasp of general knowledge.

The invention claimed is:

1. A glaze resistant to wax block bonding, wherein the components thereof are made up of potassium feldspar, lithium feldspar, calcium carbonate, talc, kaolin, wollastonite, quartz, alumina and nanopowder, the components being in the following parts by weight: potassium feldspar 30, lithium feldspar 8, calcium carbonate 10, talc 6, kaolin 10, wollastonite 10, quartz 26, alumina 1 and nanopowder 20.

2. The glaze resistant to wax block bonding of claim 1, wherein the nanopowder is made up of the following components: $Al_2O_3$, $CaCO_3$, ZnO, $BaCO_3$, $TiO_2$, $SiO_2$ and $MgO_2$.

3. The glaze resistant to wax block bonding of claim 2, wherein the components of the nanopowder are in the following parts by weight:

| | |
|---|---|
| $Al_2O_3$ | 3 parts; |
| $CaCO_3$ | 1.3 parts; |
| ZnO | 1.2 parts; |
| $BaCO_3$ | 0.4 part; |
| $TiO_2$ | 1.1 parts; |
| $SiO_2$ | 0.1 part; |
| $MgO_2$ | 0.8 part. |

4. A ceramic resistant to wax block bonding which contains a glaze resistant to wax block bonding, wherein the components of the glaze are made up of potassium feldspar, lithium feldspar, calcium carbonate, talc, kaolin, wollastonite, quartz, alumina and nanopowder, the components being in the following parts by weight: potassium feldspar 30, lithium feldspar 8, calcium carbonate 10, talc 6, kaolin 10, wollastonite 10, quartz 26, alumina 1 and nanopowder 20.

5. A process for preparing a ceramic resistant to wax block bonding, the process comprising the following steps:

S1, selecting impurity-free starting materials of stable quality in starting material component amounts having the following parts by weight: potassium feldspar 30, lithium feldspar 8, calcium carbonate 10, talc 6, kaolin 10, wollastonite 10, quartz 26, alumina 1 and nanopowder 20, and mixing the starting materials;

S2, putting the starting materials which were mixed in step S1 into a ball mill jar, with a mass ratio of starting materials:water of 1:60, and grinding for 10-12 hours to form a liquid mixture;

S3, putting the liquid mixture from step S2 into a glaze barrel, then using an iron removal machine to remove iron, sieving with a 180 mesh sieve, then keeping the liquid mixture ready for use;

S4, preparing a body by means of a ceramic blank, and subjecting the body to drying, reconditioning and biscuiting to form a green body;

S5, adjusting a density of the liquid mixture from step S2 to 38-42 degrees Baumé, and using the liquid mixture to glaze the green body from step S4;

S6, putting the green body that was processed in step S5 into a kiln, and firing at a temperature of 1230-1250° C. for 11-14 hours, to produce a ceramic resistant to wax block bonding.

6. The process of claim 5, wherein the nanopowder is made up of the following components: $Al_2O_3$, $CaCO_3$, ZnO, $BaCO_3$, $TiO_2$, $SiO_2$ and $MgO_2$.

7. The process of claim 6, wherein the components of the nanopowder are in the following parts by weight:

| | |
|---|---|
| $Al_2O_3$ | 3 parts; |
| $CaCO_3$ | 1.3 parts; |
| ZnO | 1.2 parts; |
| $BaCO_3$ | 0.4 part; |
| $TiO_2$ | 1.1 parts; |
| $SiO_2$ | 0.1 part; |
| $MgO_2$ | 0.8 part. |

8. The ceramic of claim 4, wherein the nanopowder is made up of the following components: $Al_2O_3$, $CaCO_3$, ZnO, $BaCO_3$, $TiO_2$, $SiO_2$ and $MgO_2$.

9. The ceramic of claim 8, wherein the components of the nanopowder are in the following parts by weight:

| | |
|---|---|
| $Al_2O_3$ | 3 parts; |
| $CaCO_3$ | 1.3 parts; |
| ZnO | 1.2 parts; |
| $BaCO_3$ | 0.4 part; |
| $TiO_2$ | 1.1 parts; |
| $SiO_2$ | 0.1 part; |
| $MgO_2$ | 0.8 part. |

10. The ceramic of claim 8, wherein the nanopowder consists of the following components: $Al_2O_3$, $CaCO_3$, ZnO, $BaCO_3$, $TiO_2$, $SiO_2$ and $MgO_2$.

11. The ceramic of claim 4, wherein the components of the glaze are mixed with water at a mass ratio of glaze components:water of 1:60.

12. The glaze resistant to wax block bonding of claim 1, wherein the components of the glaze are mixed with water at a mass ratio of glaze components:water of 1:60.

13. The glaze resistant to wax block bonding of claim 2, wherein the nanopowder consists of the following components: $Al_2O_3$, $CaCO_3$, ZnO, $BaCO_3$, $TiO_2$, $SiO_2$ and $MgO_2$.

* * * * *